United States Patent
Ma et al.

(10) Patent No.: US 9,176,246 B2
(45) Date of Patent: Nov. 3, 2015

(54) IDENTIFYING DOMINANT FRACTURE ORIENTATIONS

(71) Applicant: HALLIBURTON ENERGY SERVICES, INC., Houston, TX (US)

(72) Inventors: Jianfu Ma, Sugar Land, TX (US); Avi Lin, Houston, TX (US); Harold Grayson Walters, Tomball, TX (US)

(73) Assignee: Halliburton Energy Services, Inc., Houston, TX (US)

(*) Notice: Subject to any disclaimer, the term of this patent is extended or adjusted under 35 U.S.C. 154(b) by 90 days.

(21) Appl. No.: 13/896,792

(22) Filed: May 17, 2013

(65) Prior Publication Data

US 2014/0098639 A1    Apr. 10, 2014

Related U.S. Application Data

(60) Provisional application No. 61/710,582, filed on Oct. 5, 2012.

(51) Int. Cl.
*G01V 1/28* (2006.01)
*G01V 1/40* (2006.01)
(Continued)

(52) U.S. Cl.
CPC ............... *G01V 1/288* (2013.01); *G01V 1/301* (2013.01); *G01V 1/34* (2013.01); *G01V 1/345* (2013.01); *G01V 1/40* (2013.01); *G01V 2210/1234* (2013.01); *G01V 2210/646* (2013.01)

(58) Field of Classification Search
CPC ......... G01V 1/288; G01V 1/301; G01V 1/34; G01V 1/345; G01V 1/40; G01V 2210/1234; G01V 2210/646

USPC .................................................... 367/73, 38
See application file for complete search history.

(56) References Cited

U.S. PATENT DOCUMENTS 5,497,722 A    3/1996    English, Sr.
7,103,219 B2   9/2006    Cahill
(Continued)

FOREIGN PATENT DOCUMENTS

WO    WO 2008/107859    9/2008
WO    WO 2011/077223    6/2011
(Continued)

OTHER PUBLICATIONS

Pavone, "Histograms," 2006, downloaded Nov. 16, 2014 from http://www.pas.rochester.edu/~pavone/particle-www/teachers/analysis/HISTOGRAMS.htm.*
(Continued)

*Primary Examiner* — Daniel L Murphy
(74) *Attorney, Agent, or Firm* — Holly Soehnge; Fish & Richardson P.C.

(57) ABSTRACT

Systems, methods, and software can be used to identify properties of fractures in a subterranean zone. In some aspects, a basic plane orientation is determined for each of a plurality of basic planes. The basic planes are defined by coplanar subsets of microseismic event data from a fracture treatment of a subterranean zone. The quantity of the basic plane orientations in each of a plurality of ranges is calculated. In some implementations, a histogram is displayed to indicate the quantity of basic plane orientations in each of the orientation ranges. A dominant fracture orientation is identified for the subterranean zone based on one or more of the identified quantities.

20 Claims, 5 Drawing Sheets

(51) Int. Cl.
*G01V 1/34* (2006.01)
*G01V 1/30* (2006.01)

(56) References Cited

U.S. PATENT DOCUMENTS

| | | |
|---|---|---|
| 7,783,127 B1 | 8/2010 | Wilensky |
| 8,386,226 B2 | 2/2013 | Craig |
| 8,392,165 B2 | 3/2013 | Craig et al. |
| 2007/0272407 A1 | 11/2007 | Lehman et al. |
| 2008/0004847 A1 | 1/2008 | Bradford |
| 2010/0307755 A1 | 12/2010 | Xu et al. |
| 2010/0312529 A1 | 12/2010 | Souche et al. |
| 2011/0029291 A1 | 2/2011 | Weng et al. |
| 2011/0029293 A1 | 2/2011 | Petty et al. |
| 2011/0120702 A1 | 5/2011 | Craig |
| 2011/0120705 A1 | 5/2011 | Walters et al. |
| 2011/0120706 A1 | 5/2011 | Craig |
| 2011/0120718 A1 | 5/2011 | Craig |
| 2011/0125476 A1 | 5/2011 | Craig |
| 2013/0044567 A1 | 2/2013 | Kratz |
| 2013/0100769 A1 | 4/2013 | Riley et al. |
| 2013/0154846 A1* | 6/2013 | Mangione et al. ......... 340/854.6 |
| 2013/0304437 A1 | 11/2013 | Ma et al. |
| 2014/0098634 A1 | 4/2014 | Lin |

FOREIGN PATENT DOCUMENTS

| | | |
|---|---|---|
| WO | WO 2011/077227 | 6/2011 |
| WO | WO 2012/078128 | 6/2012 |
| WO | WO 2012/141720 | 10/2012 |

OTHER PUBLICATIONS

"Multimodal distribution," 2014, downloaded Nov. 16, 2014 from http://en.wikipedia.org/wiki/Multimodal_distribution, 16 pp.*

"Normal (geometry)," 2012, downloaded Nov. 16, 2014 from http://en.wikipedia.org/w/index.php?title=Normal_(geometry)&oldid=511349513, 6 pp.*

"Two dimensional histograms," GNU, 2010, downloaded Nov. 16, 2014 from https://web.archive.org/web/20101225060613/http://www.gnu.org/software/gsl/manual/html_node/Two-dimensional-histograms.html.*

Authorized officer Bream, Philip, International Search Report and Written Opinion in International Application No. PCT/US2013/056487, mailed Dec. 17, 2013, 8 pages.

Lin, "Identifying Orientation Clusters From Microseismic Data," Utility U.S. Appl. No. 13/861,986, filed Apr. 12, 2013, 65 pages.

Lin, "Updating Microseismic Histogram Data," Utility U.S. Appl. No. 13/792,772, filed Mar. 11, 2013, 67 pages.

Mayerhofer et al., "Integrating Fracture Diagnostic Engineering Data in the Marcellus Shale," SPE 145463, 2011, SPE Annual Technical Conference and Exhibition, Oct. 30-Nov. 2, 2011, Denver, Colorado, 15 pages.

Williams et al., "Quantitative Interpretation of Major Planes from Microseismic Events Locations With Application in Production Prediction", SEG 2010-2085, 2010 SEG Annual Meeting, October, Denver, Colorado, 5 pages.

Chan et al.,"Updating Formulae and a Pairwise Algorithm for Computing Sample Variances," Technical Report STAN-CS-79-773, Department of Computer Science, Stanford University, Nov. 1979, 22 pages.

West, "Updating Mean and Variance Estimates: An Improved Method," Communications of the ACM, vol. 22, No. 9, University of Dublin, Sep. 1979, 4 pages.

Welford,"Note on a method for calculating corrected sums of squares and products," Technometrics 4(3), Aug. 1962, 3 pages.

Donald E. Knuth (1998). The Art of Computer Programming, vol. 2: Seminumerical Algorithms, 3rd edn., p. 232. Boston: Addison-Wesley.

Authorized Officer Philippe Becamel, PCT International Preliminary Report on Patentability, PCT/US2013/056487, Apr. 16, 2015, 6 pages.

* cited by examiner

IDENTIFYING DOMINANT FRACTURE ORIENTATIONS

CROSS-REFERENCE TO RELATED APPLICATIONS

This application claims priority to U.S. Provisional Application Ser. No. 61/710,582, entitled "Identifying Dominant Fracture Orientations," filed on Oct. 5, 2012.

BACKGROUND

This specification relates to identifying dominant fracture orientations from microseismic data. Microseismic data are often acquired in association with hydraulic fracturing treatments applied to a subterranean formation. The hydraulic fracturing treatments are typically applied to induce artificial fractures in the subterranean formation, and to thereby enhance hydrocarbon productivity of the subterranean formation. The pressures generated by the fracture treatment can induce low-amplitude or low-energy seismic events in the subterranean formation, and the events can be detected by sensors and collected for analysis.

SUMMARY

In a general aspect, dominant fracture orientations in a subterranean zone are identified from microseismic data.

In some aspects, a basic plane orientation is determined for each of a plurality of basic planes. The basic planes are defined by and embedded in coplanar subsets of microseismic event data (e.g., three or more microseismic events) collected from a fracture treatment of a subterranean zone (e.g., collected before, during, or after fracture-related treatments). The quantity of the basic plane orientations in each of a plurality of orientation (e.g., direction) ranges is calculated. A dominant fracture orientation is identified for the subterranean zone based on one or more of the identified quantities.

Implementations may include one or more of the following features. A histogram (e.g., based on Hough transforms or other computations) is calculated and displayed; the histogram indicates the quantity of basic plane orientations in each of the direction ranges. The identified quantity of the basic plane orientations can be a probability value, a statistical value, a frequency value, a number value, or another type of value.

Additionally or alternatively, these and other implementations may include one or more of the following features. Each basic plane orientation includes a strike angle and a dip angle for one of the basic planes. The plurality of orientation ranges are identified based on the basic plane orientations. The plurality of orientation ranges are identified by sorting the strike angles, identifying clusters of the sorted strike angles, sorting the dip angles, identifying clusters of the sorted dip angles, and defining the orientation ranges based on the clusters of sorted strike angles and the clusters of sorted dip angles.

Additionally or alternatively, these and other implementations may include one or more of the following features. The plurality of orientation ranges are fixed values determined independent of the basic plane orientations. Each coplanar subset of microseismic events is identified from the microseismic event data. A normal vector to the basic plane defined by each coplanar subset is computed. The basic plane orientations are computed based on the normal vectors.

Additionally or alternatively, these and other implementations may include one or more of the following features. Identifying a dominant fracture orientation includes identifying a plurality of dominant fracture orientations. Identifying the plurality of dominant fracture orientations includes identifying the orientation ranges having the highest quantities of fracture planes. A cluster of microseismic events associated with each of the dominant fracture orientations is identified. A dominant fracture plane for each dominant fracture orientation is generated based on fitting (e.g., optimally or otherwise) the microseismic events in the cluster. The fitting process can be based on least distance algorithms, maximum likelihood algorithms, or any other appropriate techniques.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1A:
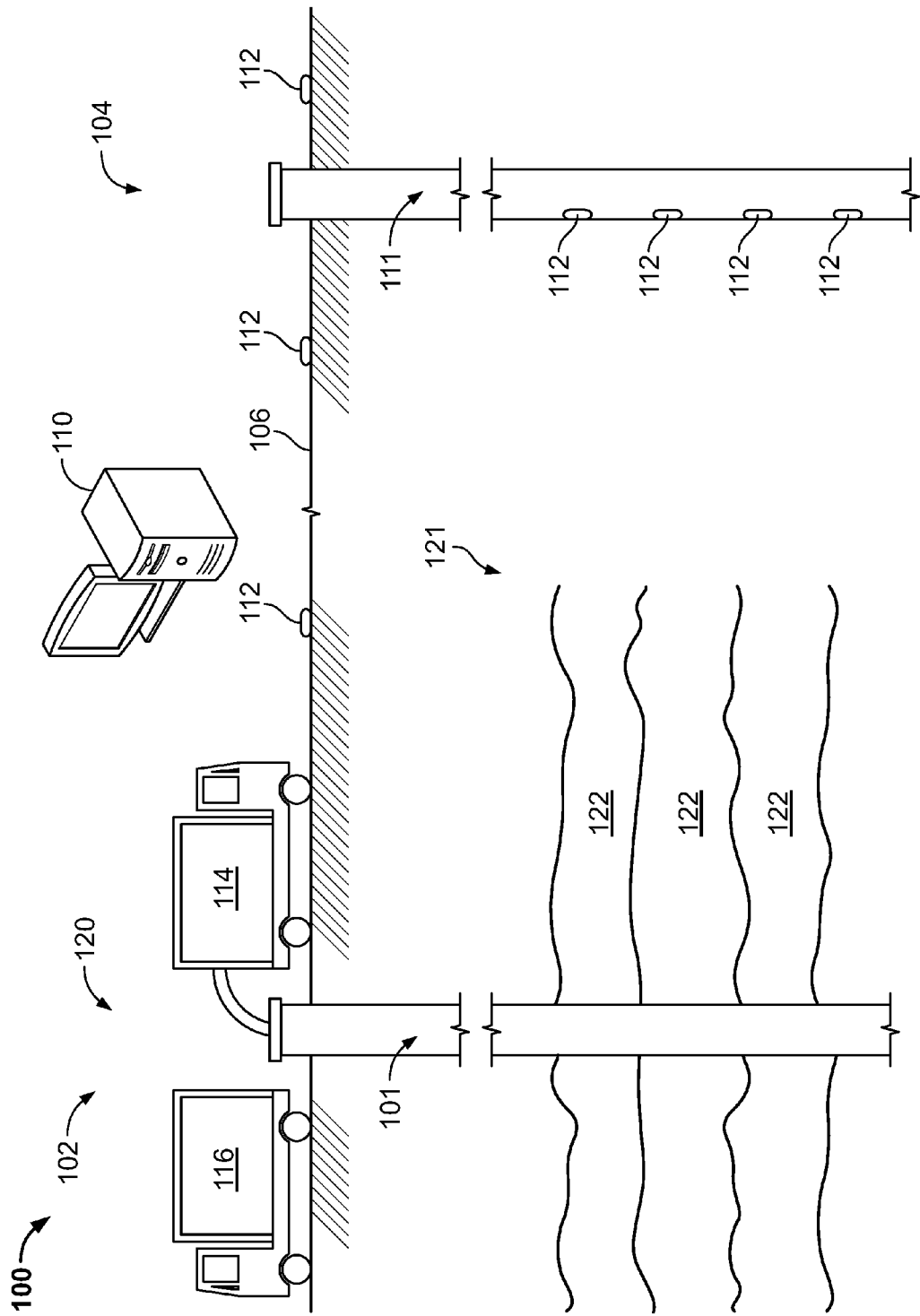
FIG. 1A is a diagram of an example well system.

The following U.S. patent applications are hereby incorporated by reference in the present disclosure: (1) U.S. Provisional Application No. 61/710,582, entitled "Identifying Dominant Fracture Orientations," filed on Oct. 5, 2012; (2) U.S. application Ser. No. 13/896,400 entitled "Geometrical Presentation Of Fracture Planes," filed on May 17, 2013; (3) U.S. application Ser. No. 13/896,389 entitled "Analyzing Microseismic Data From A Fracture Treatment," filed on May 17, 2013; (4) U.S. application Ser. No. 13/861,986 entitled "Identifying Orientation Clusters From Microseismic Data," filed on Apr. 12, 2013; (5) U.S. application Ser. No. 13/896,394 entitled "Determining A Confidence Value For A Fracture Plane," filed on May 17, 2013; (6) U.S. application Ser. No. 13/896,406 entitled "Managing Microseismic Data For Fracture Matching," filed on May 17, 2013; (7) U.S. application Ser. No. 13/792,772 entitled "Updating Microseismic Histogram Data," filed on Mar. 11, 2013; (8) U.S. application Ser. No. 13/896,425 entitled "Propagating Fracture Plane Updates," filed on May 17, 2013; (9) U.S. application Ser. No. 13/896,617 entitled "Identifying Fracture Planes From Microseismic Data," filed on May 17, 2013.

In some aspects of what is described here, fracture parameters, dominant fracture orientations, or other data are identified from microseismic data. In some instances, these or other types of data are dynamically identified, for example, in a real-time fashion during a fracture treatment or a fracture job. For many applications and analysis techniques, an identification of fracture planes from real-time microseismic events is needed, and individual fracture planes can be displayed to show time evolution and geometric elimination, including location, propagation, growth, reduction, or elimination of the fracture planes. Such capabilities can be incorporated into control systems, software, hardware, or other types of tools available to oil and gas field engineers or operators when they analyze potential oil and gas fields, while stimulating hydraulic fractures and analyzing the resultant signals. Such tools can provide a reliable and direct interface for presenting and visualizing the dynamics of hydraulic fractures, which may assist in analyzing the fracture complexity, fracture network structure, the rock-blocks movements, and reservoir geometry. Such tools can assist in evaluating the effectiveness of hydraulic fracturing treatment, for example, by improving, enhancing, or optimizing the fracture density and trace lengths and heights. Such improvements in the fracture treatment applied to the reservoir may enhance production of hydrocarbons or other resources or products from the reservoir.

Hydraulic fracture treatments can be applied in any suitable subterranean zone. Hydraulic fracture treatments are often applied in tight formations with low-permeability reservoirs, which may include, for example, low-permeability conventional oil and gas reservoirs, continuous basin-centered resource plays and shale gas reservoirs, or other types of formations. Hydraulic fracturing can induce artificial fractures in the subsurface, which can enhance the hydrocarbon productivity of a reservoir.

During the application of a hydraulic fracture treatment, the injection of high-pressure fluids can alter stresses, increase stresses, changing stresses orientations, accumulate shear stresses, and cause other effects within the geological subsurface structures. In some instances, microseismic events are associated with hydraulic fractures induced by the fracturing activities. The acoustic energy or sounds associated with rock stresses, deformations, and fracturing can be detected and collected by sensors. In some instances, microseismic events have relative low-energy (e.g., with the value of the log of the intensity or moment magnitude of less than three), and some uncertainty or accuracy or measurement error is associated with the event locations. The uncertainty can be described, for example, by a prolate spheroid, where the highest likelihood is at the spheroid center and the lowest likelihood is at the edge. In some instances, uncertainty in the signal moment (or strength), uncertainty in the event's time stamp, or a combination of these and other types of uncertainties may also occur and be described by similar or different techniques.

Microseismic event mapping can be used to geometrically locate the source point of the microseismic events based on the detected compressional and shear waves. The detected compressional and shear waves (e.g., p-waves and s-waves) can yield additional information about microseismic events, including the location of the source point, the event's location and position measurement uncertainty, the event's occurrence time, the event's moment magnitude, the direction of particle motion and energy emission spectrum, and possibly others. The microseismic events can be monitored in real time, and in some instances, the events are also processed in real time during the fracture treatment. In some instances, after the fracture treatment, the microseismic events collected from the treatment are processed together as "post data."

Processing microseismic event data collected from a fracture treatment can include fracture matching (also called fracture mapping). Fracture matching processes can identify fracture planes in any zone based on microseismic events collected from the zone. Some example computational algorithms for fracture matching utilize microseismic event data (e.g., an event's location, an event's location measurement uncertainty, an event's moment magnitude, etc.) to identify individual fractures that match the collected set of microseismic events. Some example computational algorithms can compute statistical properties of fracture patterns. The statistical properties may include, for example, fracture orientation, fracture orientation trends, fracture size (e.g., length, height, area, cross-section, etc.), fracture density, fracture complexity, fracture network properties, etc. Some computational algorithms account for uncertainty in the events' location by using multiple realizations of the microseismic event locations. For example, alternative statistical realizations associated with Monte Carlo techniques can be used for a defined probability distribution on a spheroid or another type of distribution.

Generally, fracture matching algorithms can operate on real-time data, post data, or any suitable combination of these and other types of temporal data. Some computational algorithms for fracture matching operate only on post data. Algorithms operating on post data can be used when any subset or several subsets of microseismic data to be processed has been collected from the fracture treatment; such algorithms can access (e.g., as an initial input) the full subset of microseismic events to be processed. In some implementations, fracture matching algorithms can operate on real-time data. Such algorithms may be used for real-time automatic fracture matching during the fracture treatment. Algorithms operating on real-time data can be used during the fracture treatment, and such algorithms can adapt or dynamically update a previously-identified fracture model to reflect newly-acquired microseismic events. For example, once a microseismic event is detected and collected from the treatment field, a real-time automatic fracture matching algorithm may respond to this new event by dynamically identifying and extracting fracture planes from the already-collected microseismic events in a real-time fashion. Some computational algorithms for fracture matching can operate on a combination of post data and real-time data.

In some cases, when a new microseismic event is added to an existing set of N events that were already collected in a real-time fashion, the N+1 events can be regarded as post data and be processed, for example, by an algorithm that can operate on post data. In some environments, there may not be enough time to execute a post data algorithm to a full extent in real time. In some implementations, the new event data can be processed to an appropriate extent based on, for example, the nature of the incoming real-time events, their time-spacing, their geometrical locations, the accumulated events that were not fully processed, or a combination of these and other criteria.

In some cases, fracture mapping algorithms are configured to handle conditions that arise in real-time microseismic data processing. For example, several types of challenges or conditions may occur more predominantly in the real-time context. In some instances, real-time processing techniques can be adapted to account for (or to reduce or avoid) the lower accuracy that is sometimes associated with fractures extracted from data sets lacking a sufficient number of microseismic events or lacking a sufficient number of microseismic events in certain parts of the domain. Some real-time processing techniques can be adapted to produce fracture data that are consistent with the fracture data obtainable from post data processing techniques. For example, some of the example real-time processing techniques described here have produced results that are statistically the same, according to the statistical hypothesis test (the statistical T test and F test), as results produced by post data processing techniques on the same data.

In some cases, real-time processing techniques can be adapted to readily (e.g., instantaneously, from a user's perspective) offer the identified fracture data to users. Such features may allow field engineers or operators to dynamically obtain fracture geometric information and adjust fracture treatment parameters when appropriate (e.g. to improve, enhance, optimize, or otherwise change the treatment). In some instances, fracture planes are dynamically extracted from microseismic data and displayed to field engineers in real time. Real-time processing techniques can exhibit high-speed performance. In some cases, the performance can be enhanced by parallel computing technology, distributed computing technology, parallel threading approaches, fast binary-search algorithms, or a combination of these and other hardware and software solutions that facilitate the real-time operations.

In some implementations, fracture matching technology can directly present information about fractures planes associated with three-dimensional microseismic events. The fracture planes presented can represent fracture networks that exhibit multiple orientations and activate complex fracture patterns. In some cases, hydraulic fracture parameters are extracted from a cloud of microseismic event data; such parameters may include, for example, fracture orientation trends, fracture density and fracture complexity. The fracture parameter information can be presented to field engineers or operators, for example, in a tabular, numerical, or graphical interface or an interface that combines tabular, numerical, and graphical elements. The graphical interface can be presented in real time and can exhibit the real-time dynamics of hydraulic fractures. In some instances, this can help field engineers analyze the fracture complexity, the fracture network and reservoir geometry, or it can help them better understand the hydraulic fracturing process as it progresses.

In some implementations, accuracy confidence values are used to quantify the certainty of the fracture planes extracted from microseismic data. The accuracy confidence values can be used to classify the fractures into confidence levels. For example, three confidence levels (low confidence level, medium confidence level and high confidence level) are appropriate for some contexts, while in other contexts a different number (e.g., two, four, five, etc.) of confidence levels may be appropriate. A fracture plane's accuracy confidence value can be calculated based on any appropriate data. In some implementations, a fracture plane's accuracy confidence value is calculated based on the microseismic events' locations and position uncertainties, individual microseismic events' moment magnitude, distances between individual events and their supporting fracture plane, the number of supporting events associated with the fracture plane, and the weight of variation of the fracture orientation, among others.

The accuracy confidence values can be computed and the fracture planes can be classified at any appropriate time. In some cases, the accuracy confidence values are computed and the fracture planes are classified in real time during the fracture treatment. The fracture planes can be presented to the user at any appropriate time and in any suitable format. In some instances, the fracture planes are presented graphically in a user interface in real time according to the accuracy confidence values, according to the accuracy confidence levels, or according to any other type of classification. In some instances, users can select individual groups or individual planes (e.g., those with high confidence levels) for viewing or analysis. The fracture planes can be presented to the user in an algebraic format, a numerical format, graphical format, or a combination of these and other formats.

In some implementations, microseismic events are monitored in real time during the hydraulic fracture treatment. As the events are monitored, they may also be processed in real time, they may be processed later as post data, or they may be processed using a combination of real time and post data processing. The events may be processed by any suitable technique. In some cases, the events are processed individually, at the time and in the order in which they are received.

For example, a system state $S(M, N-1)$ can be used to represent the M number of planes generated from the $N-1$ previous events. The new incoming $N^{th}$ event can trigger the system $S(M, N-1)$. In some cases, upon receiving the $N^{th}$ event, a histogram or distribution of orientation ranges is generated or updated. For example, a probability distribution histogram or the Hough transform histogram of the degenerated planes in the strike and dip angle domain can be generated to identify the feasible dominant orientations imbedded in the fractures sets.

A basic plane can be generated from a subset of microseismic events. For example, any three non-collinear points in space can uniquely define a basic plane. The basic plane defined by three non-collinear microseismic events can be represented by the normal vector to the plane with the components (a, b, c). The normal vector (a, b, c) may be computed based on the three events' spatial location. The basic plane's orientation can be computed from the normal vector. For example, the dip θ and the strike φ can be given by $$\theta = \arctan\frac{\sqrt{a^2+b^2}}{c}, \qquad (1)$$
$$\varphi = \arctan\frac{b}{a}.$$

The dip angle θ of a fracture plane can represent the angle between the fracture plane and the horizontal plane (e.g., the xy-plane). The strike angle φ of a fracture plane can represent the angle between a horizontal reference axis (e.g., the x-axis) and a horizontal line where the fracture plane intersects the horizontal plane. For example, the strike angle can be defined with respect to North or another horizontal reference direction. A fracture plane can be defined by other parameters, including angular parameters other than the strike angle and dip angle.

In general, N events can support $P=N(N-1)(N-2)/6$ basic planes, defined by the strike and dip angles. A probability histogram can be constructed from the orientation angles. The probability histogram or the enhanced Hough transformation histogram can have a suitable configuration based on the bin-size features. For example, the histogram configuration, a fix set of variable and static bins size can be based on a fixed bin size and a fixed number of bins, natural optimal bin size in the strike and dip angle domain, or other types of bins. The histogram can be based on any suitable number of microseismic events (e.g., tens, hundreds, thousands, etc.), and any suitable range of orientations. In some cases, multiple discrete bins are defined for the histogram, and each bin represents a discrete range of orientations. A quantity of basic planes in each discrete range can be computed from the basic planes. In some cases, each basic plane's orientation falls within the orientation range associated with one of the bins. For example, for N microseismic events, each of the P basic planes can be assigned to a bin, and the quantity of basic planes assigned to each bin can be computed. The quantity computed for each bin can be any suitable value. For example, the quantity can be a non-normalized number of basic planes, the quantity can be a normalized probability, frequency, or fraction of basic planes, or the quantity can be another type of value that is suitable for a histogram. A histogram can be generated to represent the quantity of basic planes assigned to all of the bins, or to represent the quantity of basic planes assigned to a subset of the bins.

In some examples, the histogram is presented as a three-dimensional bar chart, a three-dimensional surface map, or another suitable plot in an appropriate coordinate system. The peaks on the histogram plot can indicate dominant fracture orientations. For example, along one axis the histogram may represent strike angles from 0° through 360° (or another range), and the strike angles can be divided into any suitable number of bins; along another axis the histogram may represent dip angles from 60° through 90° (or another range), and the dip angles can be divided into any suitable number of bins, each may have a same or different size. The quantity (e.g., probability) for each bin can be represented along a third axis in the histogram. The resulting plot can exhibit local maxima (peaks). Each local maximum (peak) can indicate a respective strike angle and dip angle that represents a dominant fracture orientation. For example, the local maximum of the histogram may indicate that more basic planes are aligned along this direction (or range of directions) than along neighboring directions, and these basic planes are either closely parallel or substantially on the same plane.

The orientation range represented by each bin in the histogram can be determined by any appropriate technique. In some cases, each bin represents a pre-determined range of orientations. For example, the non-uniform fixed bin size method can be used. In some cases, the range or size for each bin depends on the data to be represented by the histogram. For example, the natural optimal bin size method can be used. For example, the adaptive bin size method can be used. In some instances, the basic plane orientations are sorted, and clusters of sorted orientations are identified. For example, all strikes can be sorted in a decreasing or increasing order and then grouped into clusters; similarly, all dip values can be sorted in a decreasing or increasing order and then grouped into clusters. The clusters can be associated with two-dimensional grid, and the number of basic planes in each grid cell can be counted. In some cases, this technique can dynamically generate adaptive clusters, leading to highly accurate values for the dominant orientations. This technique and associated refinements can be implemented with $N^3 \log(N)$ computational and computer memory usage complexity. In some cases, the bin sizes for both the strike and dip are fixed, and each basic plane's location grid cell can be explicitly determined by the associated strike and dip with $N^3$ computational complexity.

Fracture planes associated with a set of microseismic events can be extracted from the dominant orientations embedded in the histogram data. Basic planes that support the dominant orientation $(\theta, \phi)$ may be either nearly parallel or on the same plane. Basic planes located within the same plane can be merged together, forming a new fracture plane with stronger support (e.g., representing a larger number of microseismic events). Any suitable technique can be used to merge the fracture planes. In some cases, for each dominant orientation $(\theta, \phi)$, a normal to the plane vector is constructed with components ($\sin \theta \cos \phi$, $\sin \theta \sin \phi$, $\cos \theta$). In some instances, the results are insensitive to the location of the plane, and without loss of generality, the plane can be considered by its normal vector (e.g., assuming the origin is in the plane). The plane can be described by $x \sin \theta \cos \phi + y \sin \theta \sin \phi + z \cos \theta = 0$. The (signed) distance of each event $(x_0, y_0, z_0)$ from a basic plane to the constructed plane can be represented $d = -(x_0 \sin \theta \cos \phi + y_0 \sin \theta \sin \phi + x_0 \cos \theta)$. In this representation, events with opposite signs of d are located opposite sides of the plane.

In some cases, microseismic events are grouped into clusters based on their distance from the constructed fracture planes. For example, a cluster of events can contain the group of events closest to a constructed fracture plane. As such, each cluster of microseismic events can support a particular fracture plane. The cluster size refers to the number of the events the cluster contains. In some cases, user input or other program data can designate a minimum number of events in a sustained cluster. The minimum cluster size can depend on the number of microseismic events in the data. In some instances, the minimum cluster size should be larger than or equal three. For example, clusters having a size larger than or equal to the minimum cluster size can be considered legitimate fracture planes. A fitting algorithm can be applied to the location and location uncertainty values for the events in each cluster to find their corresponding fracture plane. In some implementations, the clustering process can use an adaptive approach. In some cases, an (optimal) cluster set can be obtained by a non-uniform binning at each of the two directions (e.g., strike and dip angles) of a basic plane orientation.

Any suitable technique can be used to identify a fracture plane from a set of microseismic events. In some cases, a Chi-square fitting technique is used. Given K observed microseismic events, the locations can be represented ($x_i$, $y_i$, $z_i$), and their measurement uncertainties can be represented ($\sigma_{i,x}$, $\sigma_{i,y}$, $\sigma_{i,z}$), where $1 \leq i \leq K$. The parameters of the plane model $z = ax + by + c$ can be calculated, for example, by minimizing the Chi-square merit function $$\chi^2(a, b, c) = \sum_{i=1}^{K} \frac{(z_i - ax_i - by_i - c)^2}{\sigma_{i,z}^2 + a^2 \sigma_{i,x}^2 + b^2 \sigma_{i,y}^2} \quad (2)$$

The Chi-square merit function can be solved by any suitable technique. In some instances, a solution can be obtained by solving three equations, which are the partial derivatives of $\chi^2$ (a, b, c) with respect to its variables, where each partial derivative is forced to zero. In some instances, there is no analytical solution for these nonlinear equations. Numerical methods (e.g., Newton's method, the Newton Rafson method, the conjugate gradient method, or another technique) can be applied to solve for the parameters a, b and c, and the strike and dip angles can be computed (e.g., using equation (1) above). The orientation of the dominant fracture plane computed from the microseismic events can be the same as, or it can be slightly different from, the dominant fracture orientation identified from the histogram. Additional or different technique can be used to solve for the plane's coefficients, for example, by minimizing the maximum absolute value of the i-th contribution $$\frac{(z_i - ax_i - by_i - c)}{\sqrt{\sigma_{i,z}^2 + a^2 \sigma_{i,x}^2 + b^2 \sigma_{i,y}^2}},$$

or any other appropriate metric.

In some implementations, an algorithm iterates over all possible dominant orientations to expand all feasible fracture planes. In some cases, the algorithm iterates over a selected subset of possible dominant orientations. The iterations can converge to planes. Some planes may be exactly equal to each other and some may be close to each other. Two planes can be considered "close" to each other, for example, when the average distance of one plane's events from another plane is less than a given threshold. The threshold distance can be designated, for example, as a control parameter. The threshold distance can be designated, for example, in an adaptive manner during the iteration process. The algorithm can merge close planes together and the support events of one plane can be associated with the support events of the other merged plane(s). The merging algorithm may designate some of the events that were associated with the two merging planes to be unassociated with the merged plane. For example, for certain relative amounts of the new unassociated events, the merge process may be postponed to later stages of the algorithm, or to later time, for the real-time case.

In some cases, constraints are imposed on the fracture planes identified from the microseismic data. For example, in some cases, the distance residual of events must be less than a given tolerance distance. The tolerance distance can be designated, for example, as a control parameter. In some instances, the identified fracture planes need to be properly computed as to represent (a maximum given) finite size of fractures. The boundary of truncated planes can be calculated from the support events' position and the events' location measurement uncertainty. The new finite-size fracture planes can be merged with the already-identified fractures, while keeping the finite-size requirements.

In some instances, a new incoming $N^{th}$ microseismic event is associated with the fracture planes already identified based on the previous N−1 microseismic events. Upon associating the new event with an existing fracture, an algorithm can be used to update the existing fracture. For example, updating the fracture may change the fracture's geometry, location, orientation, or other parameters. Upon choosing one of the previously-identified fracture planes, the fracture plane's distance from the new event can be calculated. If the distance is less than or equal to the distance control parameter, the new event can be added to the supporting event set for the fracture plane. If the distance is larger than the distance control parameter, other previously-identified fracture planes can be selected (e.g., iteratively or recursively) until a plane within the threshold distance is found. After the new event is added to a support set for a fracture plane, new strike and dip values can be evaluated and if needed can be re-calculated (e.g., using the Chi-square fitting method, or another statistical or deterministic technique) for the fracture plane. Typically, re-calculating the fracture parameters causes limited change in the orientation due to the conditional control of the distance.

In some cases, when a new microseismic event is associated with a fracture plane, one or more parameters (e.g., distance residual, area, etc.) can be modified or optimized. The plane's distance residual r can represent the average distance from the supporting events to the plane. If the distance residual is less than the given residual tolerance T, the new event can be flagged to the associated events set for the plane. In some cases, an additional process, via which other associated events of the supporting set are taken-off the list, is launched and is terminated when the distance residual r falls within the given T. In some instances, the taken-off event needs to associate itself with another fracture plane (for example, a neighboring plane). If no appropriate plane is found for the taken-off event, this event may go to an unassociated basket (for example, as in the case when a new incoming event cannot be associated with any of the existing planes). If an appropriate plane is found for the taken-off event, then the taken-off event can be regarded as a new event for this plane. The above algorithm can repeat itself and be terminated based on, for example, when the confidence level of the new plane (due to the new event) does not change much from its previous confidence level (for example, the change is within a threshold), or any other appropriate terminating criterion. A fracture plane's area can represent the size of the fracture plane. Experience shows that usually a new event causes the fracture plane to propagate in length, grow in height, or both. Thus computational processes can be constrained by a non-decreasing area condition, whereby the new plane's area should grow larger than or remain equal to that of the original plane (rather than shrink) when the new event is added to the plane.

A fracture plane's orientation can be expressed in terms of the angle, or any of its trigonometric functions. In some instances, a fracture plane's orientation can include two independent components, where each can represent the angle of the fracture plane. For example, a normal vector, the strike and dip angles, or other suitable parameters can be used to represent the fracture plane orientation. A change in a fracture plane's orientation (or other changes to a fracture plane) can cause some associated support events to be removed out of the associated events list to the un-associated event list based on their distance from the updated fracture plane. Additionally or alternatively, a change in a fracture plane's orientation can cause some previously-unassociated events to be assigned to the fracture plane based on their proximity to the updated fracture plane. Additionally, some events associated with nearby planes may also be associated with the current plane. If a new event is associated to two fracture planes, the fracture planes may intersect each other. In some cases, intersecting planes can be merged. If the new event does not belong to any existing fracture plane, it can be assigned to the "unassociated events" list.

The accumulated N microseismic events can be considered at any point to be a subset of the final post data event set. In such cases, the histogram or distribution of orientations based on the first N events may be different from the histogram or distribution of orientations constructed from the final post data. Some fracture planes extracted from N microseismic events may not be accurate, and this inaccuracy can decrease as time increases and more events are accumulated. As an example, accuracy and confidence may be lower at an initial time when the detected fracture planes are associated with microseismic events located close to the well bore. Such data may indicate fracture planes that are nearly parallel to the wellbore, even if those planes do not represent real fractures.

Fracture accuracy confidence can be used a measure for the certainty associated with fracture planes identified from microseismic data. In some cases, the accuracy confidence is identified in real time during the fracture treatment. The accuracy confidence can be determined from any suitable data using any suitable calculations. In some cases, the accuracy confidence value for a fracture plane is influenced by the number of microseismic events associated with the fracture plane. For example, the accuracy confidence value can scale (e.g., linearly, non-linearly, exponentially, polynomially, etc.) with the number of microseismic events according to a function. The number of microseismic events associated with a fracture plane can be incorporated (e.g., as a weight, an exponent, etc.) in an equation for calculating the accuracy confidence. In some instances, a fracture plane has a higher confidence value when the fracture plane is supported by a larger number of microseismic data points (or a lower confidence value when the fracture plane is supported by a smaller number of microseismic data points).

In some cases, the accuracy confidence value for a fracture plane is influenced by the location uncertainty for the microseismic events associated with the fracture plane. For example, the accuracy confidence value can scale (e.g., linearly, non-linearly, exponentially, polynomially, etc.) with the microseismic event's location uncertainty according to a function. The microseismic event's location uncertainty can be incorporated (e.g., as a weight, an exponent, or any decaying function of the distance, etc.) in an equation for calculating the accuracy confidence. In some instances, a fracture plane has a higher confidence value when the fracture plane is supported by microseismic data points having lower uncertainty (or a lower confidence value when the fracture plane is supported by microseismic data points having higher uncertainty).

In some cases, the accuracy confidence value for a fracture plane is influenced by the moment magnitude for the microseismic events associated with the fracture plane. For example, the accuracy confidence value can scale (e.g., linearly, non-linearly, exponentially, polynomially, etc.) with the microseismic event's moment magnitude according to a function. The microseismic event's moment magnitude can be incorporated (e.g., as a weight, an exponent, etc.) in an equation for calculating the accuracy confidence. The moment magnitude for a microseismic event can refer to the energy or intensity (sometimes proportional to the square of the amplitude) of the event. For example, the moment magnitude for a microseismic event can be a logarithmic scale value of the energy or intensity, or another type of value representing energy intensity. In some instances, a fracture plane has a higher confidence value when the fracture plane is supported by microseismic data points having higher intensity (or a lower confidence value when the fracture plane is supported by microseismic data points having lower intensity).

In some cases, the accuracy confidence value for a fracture plane is influenced by the distance between the fracture plane and the microseismic events associated with the fracture plane. For example, the accuracy confidence value can scale (e.g., linearly, non-linearly, exponentially, polynomially, etc.) with the average distance between the fracture plane and the microseismic events supporting the fracture plane. The average distance can be incorporated (e.g., as a weight, an exponent, etc.) in an equation for calculating the accuracy confidence. In some instances, a fracture plane has a higher confidence value when the fracture plane is supported by microseismic data points that are, on average, closer to the fracture plane (or a lower confidence value when the fracture plane is supported by microseismic data points that are, on average, farther from the fracture plane).

In some cases, the accuracy confidence value for a fracture plane is influenced by the fracture plane's orientation with respect to a dominant orientation trend in the microseismic data set. For example, the accuracy confidence value can scale (e.g., linearly, non-linearly, exponentially, polynomially, etc.) with the angular difference between the fracture plane's orientation and a dominant orientation trend in the microseismic data. The orientation angles can include strike, dip or any relevant combination (e.g., a three-dimensional spatial angle). The orientation can be incorporated (e.g., as a weight, an exponent, etc.) in an equation for calculating the accuracy confidence. A microseismic data set can have one dominant orientation trend or it can have multiple dominant orientation trends. Dominant orientation trends can be classified, for example, as primary, secondary, etc. In some instances, a fracture plane has a higher confidence value when the fracture plane is aligned with a dominant orientation trend in the microseismic data set (or a lower confidence value when the fracture plane is deviated from the dominant orientation trend in the microseismic data set).

A weighting value called the "weight of variation of fracture orientation" can represent the angular difference between the fracture plane's orientation and a dominant orientation trend in the microseismic data. The weight of variation of fracture orientation can be a scalar value that is a maximum when the fracture plane is aligned with a dominant orientation trend. The weight of variation of fracture orientation can be a minimum for fracture orientations that are maximally separated from a dominant fracture orientation trend. For example, when there is a single dominant fracture orientation trend, the weight of variation of fracture orientation can be zero for fractures that are perpendicular (or normal) to the dominant fracture orientation. As another example, when there are multiple dominant fracture orientation trends, the weight of variation of fracture orientation can be zero for fractures having orientations between the dominant fracture orientations. The weight of variation of the fracture orientation can be the ratio of the calculated plane's orientation and the orientation reflected by the homogeneous case.

In some cases, when there are multiple dominant fracture orientation trends, the weight of variation of fracture orientation has the same maximum value for each dominant fracture orientation trend. In some cases, when there are multiple dominant fracture orientations, the weight of variation of fracture orientation has a different local maximum value for each dominant fracture orientation. For example, the weight of variation of fracture orientation can be 1.0 for fractures that are parallel to a first dominant fracture orientation trend, 0.8 for fractures that are parallel to a second dominant fracture orientation trend, and 0.7 for fractures that are parallel to a third dominant fracture orientation trend. The weight of variation of fracture orientation can decrease to local minima between the dominant fracture orientations trend. For example, the weight of variation of fracture orientation between each neighboring pair of dominant fracture orientations can define a local minimum halfway between the dominant fracture orientations or at another point between the dominant fracture orientations.

The accuracy confidence parameter can be influenced by the supporting microseismic events' location uncertainty, the supporting microseismic events' moment magnitude, distance between the supporting microseismic events and the fracture plane, the number of supporting events associated with the plane, the weight of variation of fracture orientation, other values, or any appropriate combination of one or more of these. In some general models, the confidence increases as moment magnitude is larger, and as the variation of the orientation becomes larger, and the number of supporting events is larger, and their accuracy in their location is larger, and as the variation of the weight as a function of the distance is larger. These factors can be used as inputs for defining weight in an equation for the accuracy confidence. For example, in some models, the weights are linear or nonlinear functions of these factors and the weight of variation of the fracture orientation may appear with higher weight when influencing the plane's confidence. In some examples, the accuracy confidence is calculated as:

$$\text{Confidence} = (\text{weight of variation of fracture orientation}) * \sum_{i=1}^{number\ of\ events} ((\text{location uncertainty weight}) * (\text{moment magnitude weight}) * (\text{distance variation weight})). \quad (3)$$

Other equations or algorithms can be used to compute the confidence.

The identified fracture planes can be classified into confidence levels based on the fracture planes' accuracy confidence values. In some instances, three levels are used: low confidence level, medium confidence level and high confidence level. Any suitable number of confidence levels can be used. In some examples, when a new event is added to the supporting set associated with an existing fracture plane, its associated fracture confidence parameter may increase, which may cause the fracture plane to roll from its current confidence level to a higher one, if it exists. As another example, if a fracture's orientation diverts away from orientation trends exhibited by post microseismic event data, as microseismic events gradually accumulate, a decrease in fracture confidence may be induced, mainly by the weight of variation of fracture orientation, causing the plane to decrease its level to a lower confidence level, if it exists. This may particularly apply to fractures created at the initial time of hydraulic fracturing treatment; it may also apply to other types of fractures in other contexts.

Users (e.g., field engineers, operational engineers and analysts, and others) can be provided a graphical display of the fracture planes identified from the microseismic data. In some cases, the graphical display allows the user to visualize the identified planes in a real time fashion, in graphical panels presenting the confidence levels. For example, three graphical panels can be used to separately present the low confidence level, medium confidence level and high confidence level fracture planes. In some cases, the lower confidence level fracture planes are created in the initial times of the fracturing treatment. In some cases, higher confidence level fracture planes propagate in time in the direction nearly perpendicular to the wellbore. As new microseismic events gradually accumulate in time, the graphical display can be updated to enable users to dynamically observe the fracture planes association among confidence levels associated with the graphical panels.

The confidence level groups can be presented as plots of the fracture planes, or the confidence level groups can be presented in another format. The confidence level groups can be presented algebraically, for example, by showing the algebraic parameters (e.g., parameters for the equation of a plane) of the fracture planes in each group. The confidence level groups can be presented numerically, for example, by showing the numerical parameters (e.g., strike, dip, area, etc.) of the fracture planes in each group. The confidence level groups can be presented in a tabular form, for example, by presenting a table of the algebraic parameters or numerical parameters of the fracture planes in each group. Moreover, a fracture plane can be represented graphically in a three-dimensional space, a two-dimensional space, or another space. For example, a fracture plane can be represented in a rectilinear coordinate system (e.g., x, y, z coordinates) in a polar coordinate system (e.g., r, θ, φ coordinates), or another coordinate system. In some examples, a fracture plane can be represented as a line at the fracture plane's intersection with another plane (e.g., a line in the xy-plane, a line in the xz-plane, a line in the yz-plane, or a line in any arbitrary plane or surface).

In some instances, a graphical display allows users to track and visualize spatial and temporal evolution of specific fracture planes, including their generation, propagation and growth. For example, a user may observe stages of a specific fracture plane's spatial and temporal evolution such as, for example, initially identifying the fracture plane based on three microseismic events, a new event that changes the plane's orientation, a new event that causes the planes' area to grow (e.g., vertically, horizontally, or both), or other stages in the evolution of a fracture plane. The spatial and temporal evolution of fracture planes may present the travel paths of stimulated fluids and proppants injected into the rock matrix. Visualization of dynamics of fracture planes can help users better understand the hydraulic fracturing process, analyze the fracture complexity more accurately, evaluate the effectiveness of hydraulic fracture, or improve the well performance.

Although this application describes examples involving microseismic event data, the techniques and systems described in this application can be applied to other types of data. For example, the techniques and systems described here can be used to process data sets that include data elements that are unrelated to microseismic events, which may include other types of physical data associated with a subterranean zone. In some aspects, this application provides a framework for processing large volumes of data, and the framework can be adapted for various applications that are not specifically described here. For example, the techniques and systems described here can be used to analyze spatial coordinates, orientation data, or other types of information collected from any source. As an example, soil or rock samples can be collected (e.g., during drilling), and the concentration of a given compound (e.g., a certain "salt") as function of location can be identified. This may help geophysicists and operators evaluate the geo-layers in the ground.

FIG. 1A shows a schematic diagram of an example well system 100 with a computing subsystem 110. The example well system 100 includes a treatment well 102 and an observation well 104. The observation well 104 can be located remotely from the treatment well 102, near the treatment well 102, or at any suitable location. The well system 100 can include one or more additional treatment wells, observation wells, or other types of wells. The computing subsystem 110 can include one or more computing devices or systems located at the treatment well 102, at the observation well 104, or in other locations. The computing subsystem 110 or any of its components can be located apart from the other components shown in FIG. 1A. For example, the computing subsystem 110 can be located at a data processing center, a computing facility, or another suitable location. The well system 100 can include additional or different features, and the features of the well system can be arranged as shown in FIG. 1A or in any other suitable configuration.

The example treatment well 102 includes a well bore 101 in a subterranean zone 121 beneath the surface 106. The subterranean zone 121 can include one or less than one rock formation, or the subterranean zone 121 can include more than one rock formation. In the example shown in FIG. 1A, the subterranean zone 121 includes various subsurface layers 122. The subsurface layers 122 can be defined by geological or other properties of the subterranean zone 121. For example, each of the subsurface layers 122 can correspond to a particular lithology, a particular fluid content, a particular stress or pressure profile, or any other suitable characteristic. In some instances, one or more of the subsurface layers 122 can be a fluid reservoir that contains hydrocarbons or other types of fluids. The subterranean zone 121 may include any suitable rock formation. For example, one or more of the subsurface layers 122 can include sandstone, carbonate materials, shale, coal, mudstone, granite, or other materials.

The example treatment well 102 includes an injection treatment subsystem 120, which includes instrument trucks 116, pump trucks 114, and other equipment. The injection treatment subsystem 120 can apply an injection treatment to the subterranean zone 121 through the well bore 101. The injection treatment can be a fracture treatment that fractures the subterranean zone 121. For example, the injection treatment may initiate, propagate, or open fractures in one or more of the subsurface layers 122. A fracture treatment may include a mini fracture test treatment, a regular or full fracture treatment, a follow-on fracture treatment, a re-fracture treatment, a final fracture treatment or another type of fracture treatment.

The fracture treatment can inject a treatment fluid into the subterranean zone 121 at any suitable fluid pressures and fluid flow rates. Fluids can be injected above, at or below a fracture initiation pressure, above at or below a fracture closure pressure, or at any suitable combination of these and other fluid pressures. The fracture initiation pressure for a formation is the minimum fluid injection pressure that can initiate or propagate artificial fractures in the formation. Application of a fracture treatment may or may not initiate or propagate artificial fractures in the formation. The fracture closure pressure for a formation is the minimum fluid injection pressure that can dilate existing fractures in the subterranean formation. Application of a fracture treatment may or may not dilate natural or artificial fractures in the formation.

A fracture treatment can be applied by any appropriate system, using any suitable technique. The pump trucks 114 may include mobile vehicles, immobile installations, skids, hoses, tubes, fluid tanks or reservoirs, pumps, valves, or other suitable structures and equipment. In some cases, the pump trucks 114 are coupled to a working string disposed in the well bore 101. During operation, the pump trucks 114 can pump fluid through the working string and into the subterranean zone 121. The pumped fluid can include a pad, proppants, a flush fluid, additives, or other materials.

A fracture treatment can be applied at a single fluid injection location or at multiple fluid injection locations in a subterranean zone, and the fluid may be injected over a single time period or over multiple different time periods. In some instances, a fracture treatment can use multiple different fluid injection locations in a single well bore, multiple fluid injection locations in multiple different well bores, or any suitable combination. Moreover, the fracture treatment can inject fluid through any suitable type of well bore, such as, for example, vertical well bores, slant well bores, horizontal well bores, curved well bores, or any suitable combination of these and others.

A fracture treatment can be controlled by any appropriate system, using any suitable technique. The instrument trucks 116 can include mobile vehicles, immobile installations, or other suitable structures. The instrument trucks 116 can include an injection control system that monitors and controls the fracture treatment applied by the injection treatment subsystem 120. In some implementations, the injection control system can communicate with other equipment to monitor and control the injection treatment. For example, the instrument trucks 116 may communicate with the pump truck 114, subsurface instruments, and monitoring equipment.

The fracture treatment, as well as other activities and natural phenomena, can generate microseismic events in the subterranean zone 121, and microseismic data can be collected from the subterranean zone 121. For example, the microseismic data can be collected by one or more sensors 112 associated with the observation well 104, or the microseismic data can be collected by other types of systems. The microseismic information detected in the well system 100 can include acoustic signals generated by natural phenomena, acoustic signals associated with a fracture treatment applied through the treatment well 102, or other types of signals. For example, the sensors 112 may detect acoustic signals generated by rock slips, rock movements, rock fractures or other events in the subterranean zone 121. In some instances, the locations of individual microseismic events can be determined based on the microseismic data.

Microseismic events in the subterranean zone 121 may occur, for example, along or near induced hydraulic fractures. The microseismic events may be associated with pre-existing natural fractures or hydraulic fracture planes induced by fracturing activities. In some environments, the majority of detectable microseismic events are associated with shear-slip rock fracturing. Such events may or may not correspond to induced tensile hydraulic fractures that have significant width generation. The orientation of a fracture can be influenced by the stress regime, the presence of fracture systems that were generated at various times in the past (e.g., under the same or a different stress orientation). In some environments, older fractures can be cemented shut over geologic time, and remain as planes of weakness in the rocks in the subsurface.

The observation well 104 shown in FIG. 1A includes a well bore 111 in a subterranean region beneath the surface 106. The observation well 104 includes sensors 112 and other equipment that can be used to detect microseismic information. The sensors 112 may include geophones or other types of listening equipment. The sensors 112 can be located at a variety of positions in the well system 100. In FIG. 1A, sensors 112 are installed at the surface 106 and beneath the surface 106 in the well bore 111. Additionally or alternatively, sensors may be positioned in other locations above or below the surface 106, in other locations within the well bore 111, or within another well bore. The observation well 104 may include additional equipment (e.g., working string, packers, casing, or other equipment) not shown in FIG. 1A. In some implementations, microseismic data are detected by sensors installed in the treatment well 102 or at the surface 106, without use of an observation well.

In some cases, all or part of the computing subsystem 110 can be contained in a technical command center at the well site, in a real-time operations center at a remote location, in another appropriate location, or any suitable combination of these. The well system 100 and the computing subsystem 110 can include or access any suitable communication infrastructure. For example, well system 100 can include multiple separate communication links or a network of interconnected communication links. The communication links can include wired or wireless communications systems. For example, sensors 112 may communicate with the instrument trucks 116 or the computing subsystem 110 through wired or wireless links or networks, or the instrument trucks 116 may communicate with the computing subsystem 110 through wired or wireless links or networks. The communication links can include a public data network, a private data network, satellite links, dedicated communication channels, telecommunication links, or any suitable combination of these and other communication links.

The computing subsystem 110 can analyze microseismic data collected in the well system 100. For example, the computing subsystem 110 may analyze microseismic event data from a fracture treatment of a subterranean zone 121. Microseismic data from a fracture treatment can include data collected before, during, or after fluid injection. The computing subsystem 110 can receive the microseismic data at any suitable time. In some instances, the computing subsystem 110 receives the microseismic data in real time (or substantially in real time) during the fracture treatment. For example, the microseismic data may be sent to the computing subsystem 110 immediately upon detection by the sensors 112. In some instances, the computing subsystem 110 receives some or all of the microseismic data after the fracture treatment has been completed. The computing subsystem 110 can receive the microseismic data in any suitable format. For example, the computing subsystem 110 can receive the microseismic data in a format produced by microseismic sensors or detectors, or the computing subsystem 110 can receive the microseismic data after the microseismic data has been formatted, packaged, or otherwise processed. The computing subsystem 110 can receive the microseismic data by any suitable means. For example, the computing subsystem 110 can receive the microseismic data by a wired or wireless communication link, by a wired or wireless network, or by one or more disks or other tangible media.

Figure 2:
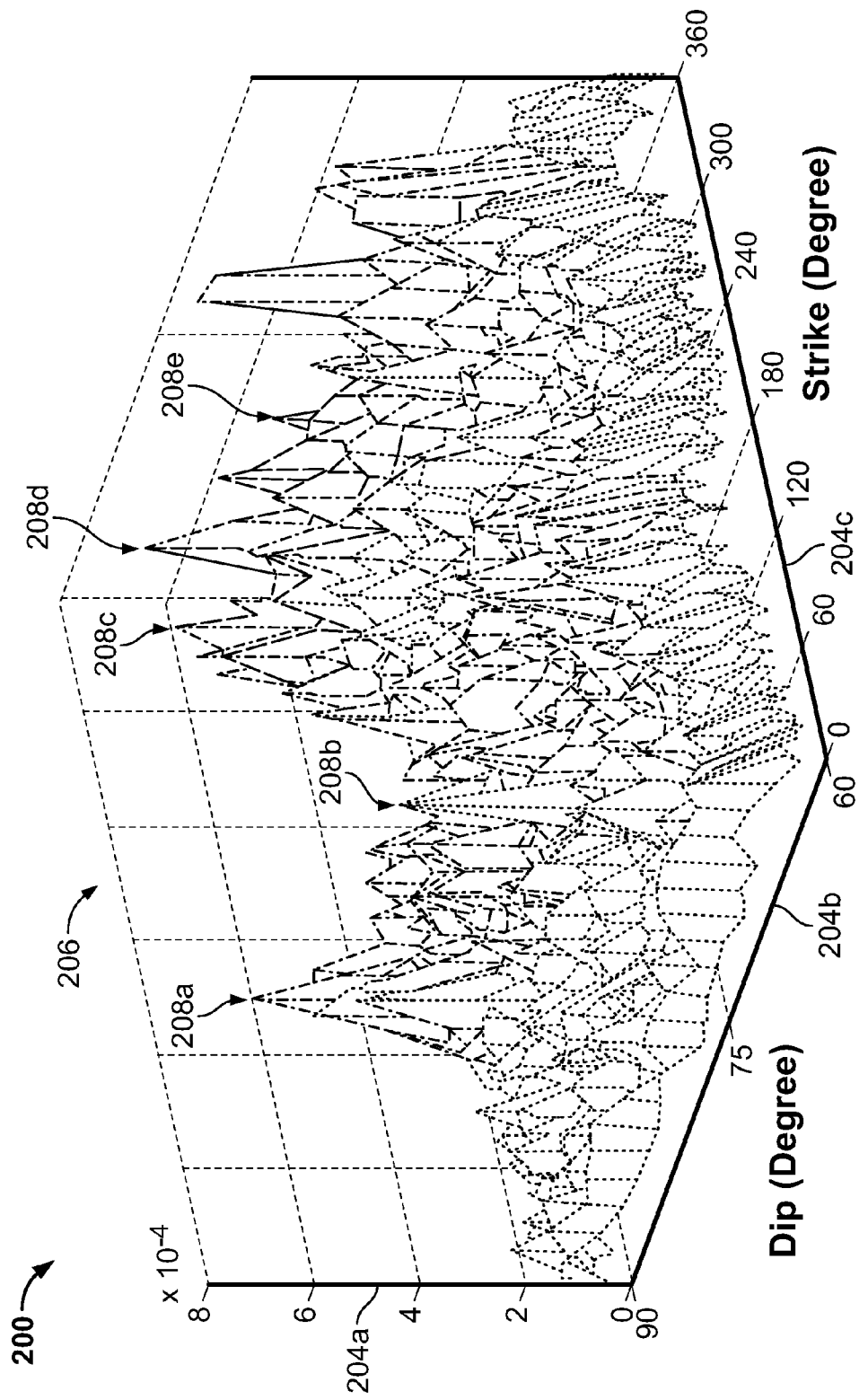
FIG. 2 is a plot showing an example histogram.

The computing subsystem 110 can be used to generate a histogram based on microseismic events. The histogram can be used, for example, to identify dominant fracture orientations in the subterranean zone 121. FIG. 2 shows an example of a histogram. The dominant fracture orientations can be identified, for example, based on local maxima in the histogram data. The dominant fracture orientations can correspond to the orientations of fracture families in the subterranean zone 121. In some cases, the microseismic data corresponding to each dominant fracture orientation are used to generate one or more fracture planes.

Some of the techniques and operations described herein may be implemented by a computing subsystem configured to provide the functionality described. In various embodiments, a computing device may include any of various types of devices, including, but not limited to, personal computer systems, desktop computers, laptops, notebooks, mainframe computer systems, handheld computers, workstations, tablets, application servers, storage devices, or any type of computing or electronic device.

Figure 1B:
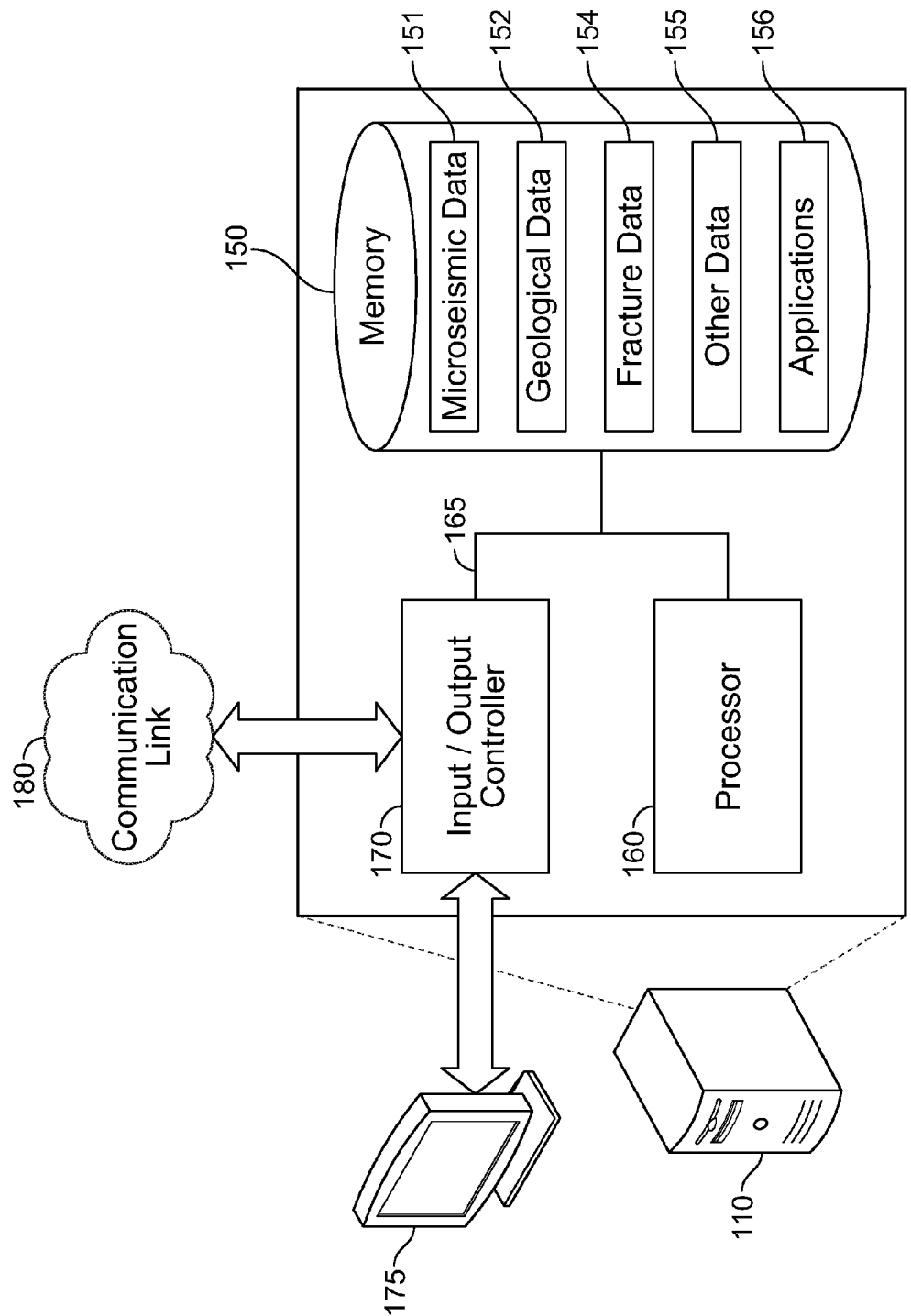
FIG. 1B is a diagram of the example computing subsystem 110 of FIG. 1A.

FIG. 1B is a diagram of the example computing subsystem 110 of FIG. 1A. The example computing subsystem 110 can be located at or near one or more wells of the well system 100 or at a remote location. All or part of the computing subsystem 110 may operate independent of the well system 100 or independent of any of the other components shown in FIG. 1A. The example computing subsystem 110 includes a processor 160, a memory 150, and input/output controllers 170 communicably coupled by a bus 165. The memory can include, for example, a random access memory (RAM), a storage device (e.g., a writable read-only memory (ROM) or others), a hard disk, or another type of storage medium. The computing subsystem 110 can be preprogrammed or it can be programmed (and reprogrammed) by loading a program from another source (e.g., from a CD-ROM, from another computer device through a data network, or in another manner). The input/output controller 170 is coupled to input/output devices (e.g., a monitor 175, a mouse, a keyboard, or other input/output devices) and to a communication link 180. The input/output devices receive and transmit data in analog or digital form over communication links such as a serial link, a wireless link (e.g., infrared, radio frequency, or others), a parallel link, or another type of link.

The communication link 180 can include any type of communication channel, connector, data communication network, or other link. For example, the communication link 180 can include a wireless or a wired network, a Local Area Network (LAN), a Wide Area Network (WAN), a private network, a public network (such as the Internet), a WiFi network, a network that includes a satellite link, or another type of data communication network.

The memory 150 can store instructions (e.g., computer code) associated with an operating system, computer applications, and other resources. The memory 150 can also store application data and data objects that can be interpreted by one or more applications or virtual machines running on the computing subsystem 110. As shown in FIG. 1B, the example memory 150 includes microseismic data 151, geological data 152, fracture data 154, other data 155, and applications 156. In some implementations, a memory of a computing device includes additional or different information.

The microseismic data 151 can include information on the locations of microseisms in a subterranean zone. For example, the microseismic data can include information based on acoustic data detected at the observation well 104, at the surface 106, at the treatment well 102, or at other locations. The microseismic data 151 can include information collected by sensors 112. In some cases, the microseismic data 151 has been combined with other data, reformatted, or otherwise processed. The microseismic event data may include any suitable information relating to microseismic events (locations, magnitudes, uncertainties, times, etc.). The microseismic event data can include data collected from one or more fracture treatments, which may include data collected before, during, or after a fluid injection.

The geological data 152 can include information on the geological properties of the subterranean zone 121. For example, the geological data 152 may include information on the subsurface layers 122, information on the well bores 101, 111, or information on other attributes of the subterranean zone 121. In some cases, the geological data 152 includes information on the lithology, fluid content, stress profile, pressure profile, spatial extent, or other attributes of one or more rock formations in the subterranean zone. The geological data 152 can include information collected from well logs, rock samples, outcroppings, microseismic imaging, or other data sources.

The fracture data 154 can include information on fracture planes in a subterranean zone. The fracture data 154 may identify the locations, sizes, shapes, and other properties of fractures in a model of a subterranean zone. The fracture data 154 can include information on natural fractures, hydraulically-induced fractures, or any other type of discontinuity in the subterranean zone 121. The fracture data 154 can include fracture planes calculated from the microseismic data 151. For each fracture plane, the fracture data 154 can include information (e.g., strike angle, dip angle, etc.) identifying an orientation of the fracture, information identifying a shape (e.g., curvature, aperture, etc.) of the fracture, information identifying boundaries of the fracture, or any other suitable information.

The applications 156 can include software applications, scripts, programs, functions, executables, or other modules that are interpreted or executed by the processor 160. Such applications may include machine-readable instructions for performing one or more of the operations represented in FIG. 4. The applications 156 may include machine-readable instructions for generating a user interface or a plot, such as, for example, the histogram represented in FIG. 2. The applications 156 can obtain input data, such as microseismic data, geological data, or other types of input data, from the memory 150, from another local source, or from one or more remote sources (e.g., via the communication link 180). The applications 156 can generate output data and store the output data in the memory 150, in another local medium, or in one or more remote devices (e.g., by sending the output data via the communication link 180).

The processor 160 can execute instructions, for example, to generate output data based on data inputs. For example, the processor 160 can run the applications 156 by executing or interpreting the software, scripts, programs, functions, executables, or other modules contained in the applications 156. The processor 160 may perform one or more of the operations represented in FIG. 4 or generate the histogram shown in FIG. 2. The input data received by the processor 160 or the output data generated by the processor 160 can include any of the microseismic data 151, the geological data 152, the fracture data 154, or the other data 155.

FIG. 2 is a plot showing an example histogram 200. The example histogram 200 shown in FIG. 2 is a graphical representation of the distribution of basic plane orientations identified from a set of microseismic data. A histogram can be generated based on other types of data, and a histogram can represent other types of information.

The example histogram 200 shown in FIG. 2 includes a plot of a surface 206 representing fracture plane orientation probabilities. In some instances, a histogram includes another type of plot. For example, a histogram can convey the same or similar information by a bar plot, a topographical plot, or another type of plot. In the example shown in FIG. 2, each fracture plane orientation is represented by two variables— the strike angle and the dip angle. A histogram can be used to represent a distribution of quantities over one variable, two variables, three variables, or more.

The surface 206 shown in FIG. 2 is plotted in a three-dimensional coordinate system. Some example histograms are plotted in two dimensions (e.g., for a distribution over a single variable), three dimensions (e.g., for a distribution over two variables), or four dimensions (e.g., for a distribution over two variables over time). In the example shown in FIG. 2, the three-dimensional coordinate system is represented by the vertical axis 204a and the two horizontal axes 204b and 204c. The horizontal axis 204b represents a range of dip angles, and the horizontal axis 204c represents a range of strike angles (units of degrees). The vertical axis 204a represents a range of probabilities.

Parameters of the histogram 200 can computed, for example, by generating bins that each represent a distinct orientation range. The orientation ranges can be adjacent, non-overlapping ranges for one or more orientation variables. For example, a bin can represent a range of strike angles and a range of dip angles. In the histogram 200 shown in FIG. 2, each of the histogram bins corresponds to an intersection of sub-ranges along the horizontal axes 204b and 204c.

Additional parameters of the histogram 200 can be computed, for example, by computing the quantity of fracture orientations associated with each bin. In the histogram 200 shown in FIG. 2, the quantity for each bin is represented by the level of the surface 206 for each of the orientation ranges represented in the plot. The quantities represented in FIG. 2 are normalized probability values. Generally, the quantity for each bin in a histogram can be a normalized quantity or a non-normalized quantity. For example, the quantity of fracture planes for each bin can be a probability value, a frequency value, an integer number value, or another type of value.

The quantity of fracture planes for each bin of the histogram can be computed, for example, by assigning each fracture plane to a bin, by counting the number of fracture planes having an orientation within the range represented by each bin, or by a combination of these and other techniques. In some cases, the fracture planes are basic planes defined by microseismic data points, and each of the basic planes defines an orientation corresponding to one of the bins.

The example histogram 200 represents the probability distribution of basic planes associated with 180 microseismic events. In this example, each bin represents a sub-range of strike values within the strike range indicated in the histogram 200 (0° through 360°) and a sub-range of dip values within the dip range indicated in the histogram 200 (60° through 90°). The surface 206 map exhibits several local maxima (peaks), five of which are labeled as 208a, 208b, 208c, 208d, and 208e in FIG. 2.

The peaks in the histogram 200 represent the bins associated with higher quantities than surrounding bins. The bins represented by the peaks correspond to a set of fracture planes having similar or parallel orientations. In some instances, each local maximum (or peak) in the histogram can be considered as corresponding to a dominant (i.e., principal) orientation trend. An orientation trend can be considered a dominant fracture orientation, for example, when more basic planes are aligned along this direction than along its neighboring or nearby directions. A dominant fracture orientation can represent a statistically significant quantity of basic planes that are either parallel, substantially parallel, or on the same plane.

The example shown in FIG. 2 is a histogram based on two angular parameters of each basic plane (i.e., strike and dip angles). A histogram can be based on other parameters of the basic planes. For example, a third parameter of each basic plane can be incorporated in the histogram data. The third parameter can be, for example, the distance d of the basic plane from the origin. A histogram can be generated for distance-related parameters, orientation-related parameters, or combinations of them. In some examples, a histogram can be generated for the values d tan(θ) and d tan(φ) for each basic plane, based on the distance d of each basic plane from the origin, the strike angle φ of each basic plane, and the dip angle θ of each basic plane. In some cases, a two dimensional histogram can be generated based on any two independent variables, such as, for example, tan(θ), tan(φ), the strike angle φ, the dip angle θ, or others. The histogram can have a suitable configuration based on the bin-size features. For example, the histogram can be a fixed bin size histogram, a natural bin size histogram, or another type of histogram. In some instances, for a given set of microseismic events, there may exist an optimal (non-uniform) histogram that best shows the fracture planes orientations.

Figure 3A:
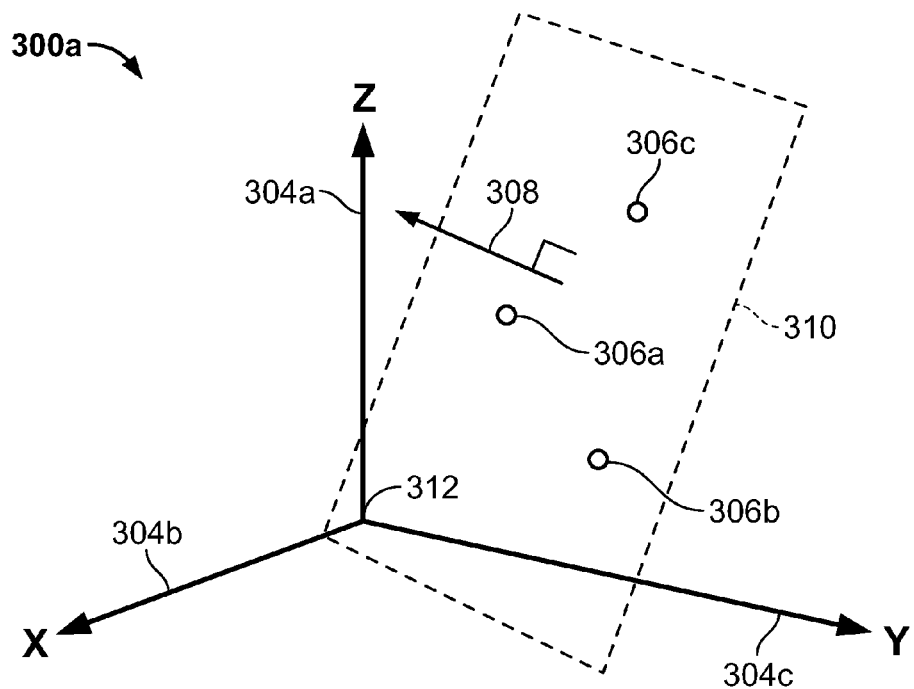
FIGS. 3A and 3B are plots showing an example fracture plane orientation.
Figure 3B:
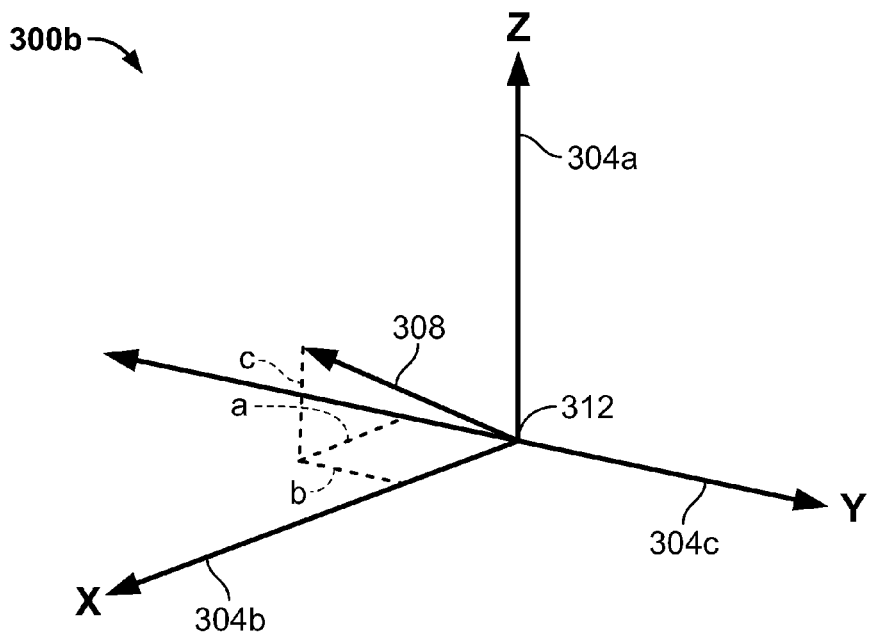

FIGS. 3A and 3B are plots showing an example fracture plane orientation. FIG. 3A shows a plot 300a of an example basic plane 310 defined by three non-collinear microseismic events 306a, 306b, and 306c. FIG. 3B shows a plot 300b of the normal vector 308 for the basic plane 310 shown in FIG. 3A. In FIGS. 3A and 3B, the vertical axis 304a represents the z-coordinate, the horizontal axis 304b represents the x-coordinate, and the horizontal axis 304c represents the y-coordinate. The plots 300a and 300b show a rectilinear coordinate system; other types of coordinate systems (e.g., spherical, elliptical, etc.) can be used.

As shown in FIG. 3A, the basic plane 310 is a two-dimensional surface that extends through the three-dimensional xyz-coordinate system. The normal vector 308 indicates the orientation of the basic plane 310. A normal vector can be a unit vector (a vector having unit length) or a normal vector can have non-unit length.

As shown FIG. 3B, the normal vector 308 has vector components (a, b, c). The vector components (a, b, c) can be computed, for example, based on the positions of the microseismic events 306a, 306b, and 306c, based on the parameters of the basic plane 310, or based on other information. In the plot 300b, the x-component of the normal vector 308 is represented as the length a along the x-axis, the y-component of the normal vector 308 is represented as the length b along the y-axis, and the z-component of the normal vector 308 is represented as the length c along the z-axis. (In the example shown, the y-component b is a negative value, which means the y-component of the normal vector 308 is opposite to the default positive direction of the horizontal axis 304c.)

The orientation of the basic plane 310 can be computed from the normal vector 308, the microseismic events themselves, parameters of the basic plane 310, other data, or any combination of these. For example, the dip θ and the strike φ of the basic plane 310 can be computed from the normal vector 308 based on the equations $$\theta = \arctan\frac{\sqrt{a^2+b^2}}{c}, \quad (1)$$

$$\varphi = \arctan\frac{b}{a}.$$

In some cases, computational techniques can account for and properly manage the sensitivity of these equations in extreme cases, for example, where the parameter a or c is very small.

In some cases, the orientation of one or more basic planes can be used as input for generating histogram data. For example, a histogram of the basic plane orientations can be generated from a set of basic planes. In some cases, the histogram data is generated by assigning each basic plane to a bin based on the basic plane's orientation ($\theta$, $\phi$) and computing the quantity of basic planes associated with each bin. In some cases, the histogram is plotted, or the histogram data can be used or processed without displaying the histogram.

Figure 4:
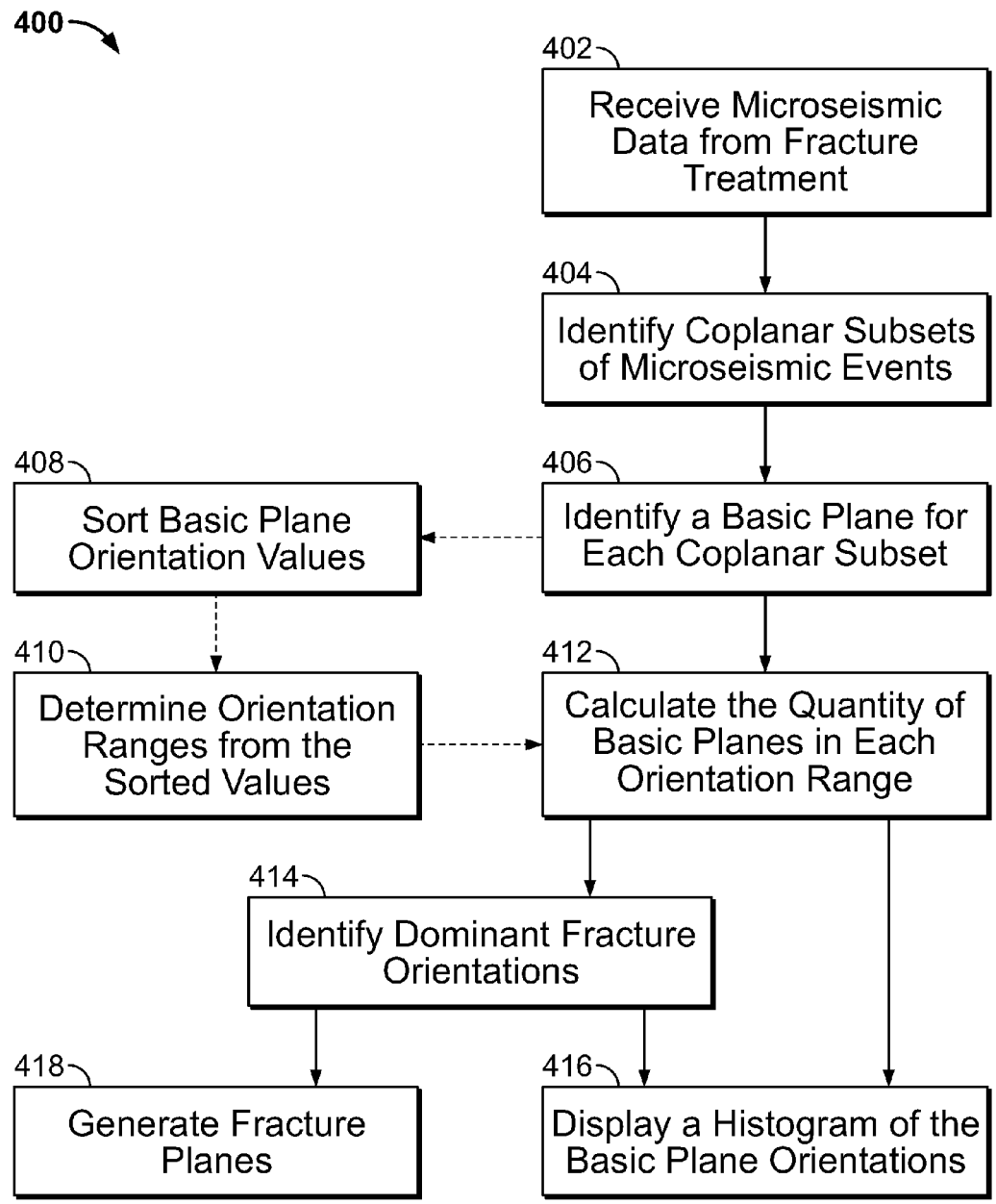
FIG. 4 is a flow chart of an example technique for identifying dominant fracture orientations.

FIG. 4 is a flow chart of an example process 400 for identifying dominant fracture orientations. Some or all of the operations in the process 400 can be implemented by one or more computing devices. In some implementations, the process 400 may include additional, fewer, or different operations performed in the same or a different order. Moreover, one or more of the individual operations or subsets of the operations in the process 400 can be performed in isolation or in other contexts. Output data generated by the process 400, including output generated by intermediate operations, can include stored, displayed, printed, transmitted, communicated or processed information.

In some implementations, some or all of the operations in the process 400 are executed in real time during a fracture treatment. An operation can be performed in real time, for example, by performing the operation in response to receiving data (e.g., from a sensor or monitoring system) without substantial delay. An operation can be performed in real time, for example, by performing the operation while monitoring for additional microseismic data from the fracture treatment. Some real time operations can receive an input and produce an output during a fracture treatment; in some instances, the output is made available to a user within a time frame that allows the user to respond to the output, for example, by modifying the fracture treatment.

In some cases, some or all of the operations in the process 400 are executed dynamically during a fracture treatment. An operation can be executed dynamically, for example, by iteratively or repeatedly performing the operation based on additional inputs, for example, as the inputs are made available. In some instances, dynamic operations are performed in response to receiving data for a new microseismic event (or in response to receiving data for a certain number of new microseismic events, etc.).

At 402, microseismic data from a fracture treatment are received. For example, the microseismic data can be received from memory, from a remote device, or another source. The microseismic event data may include information on the measured locations of multiple microseismic events, information on a measured magnitude of each microseismic event, information on an uncertainty associated with each microseismic event, information on a time associated with each microseismic event, etc. The microseismic event data can include microseismic data collected at an observation well, at a treatment well, at the surface, or at other locations in a well system. Microseismic data from a fracture treatment can include data for microseismic events detected before, during, or after the fracture treatment is applied. For example, in some instances, microseismic monitoring begins before the fracture treatment is applied, ends after the fracture treatment is applied, or both.

At 404, coplanar subsets of microseismic events are identified. A coplanar subset of microseismic events can include three microseismic events or more than three microseismic events. For example, each subset can be a triplet of microseismic event locations. In some cases, the coplanar subsets are identified by identifying all triplets in a set of microseismic event data. For example, for N microseismic event locations, N(N−1)(N−2)/6 triplets can be identified. In some cases, less than all triplets are identified as subsets. For example, some triplets (e.g., collinear or substantially collinear triplets) may be excluded.

At 406, a basic plane is identified for each coplanar subset of microseismic events. For example, a basic plane can be identified by calculating the parameters of a basic plane based on a triplet of microseismic event locations. In some cases, a plane can be defined by the three parameters a, b, and c of the basic plane model. These parameters can be calculated based on the x, y and z coordinates of three non-collinear points in a subset, for example, by solving a system of linear equations for the three parameters. For example, the parameters of a plane defined by three non-collinear events $(x_1, y_1, z_1)$, $(x_2, y_2, z_2)$ and $(x_3, y_3, z_3)$ can be computed based on solving the following system of equations:

$$ax + by + c + d = 0$$

$$a = \begin{bmatrix} 1 & y_1 & z_1 \\ 1 & y_2 & z_2 \\ 1 & y_3 & z_3 \end{bmatrix},$$

$$b = \begin{bmatrix} x_1 & 1 & z_1 \\ x_2 & 1 & z_2 \\ x_3 & 1 & z_3 \end{bmatrix},$$

$$c = \begin{bmatrix} x_1 & y_1 & 1 \\ x_2 & y_2 & 1 \\ x_3 & y_3 & 1 \end{bmatrix},$$

$$d = -\begin{bmatrix} x_1 & y_1 & z_1 \\ x_2 & y_2 & z_2 \\ x_3 & y_3 & z_3 \end{bmatrix}$$

At 408, the quantity of basic planes in each of a plurality of orientation ranges is calculated. The orientation ranges can correspond to histogram bins. In some cases, the orientation ranges collectively cover a full range of basic plane orientations, and each individual orientation range corresponds to a solid angle in three-dimensional space. A solid angle can be defined, for example, by a range of dip angles and a range of strike angles, or by angular ranges based on combinations of the strike angle and the dip angle.

The quantity of basic planes in each orientation range can be calculated, for example, by identifying the orientation of each basic plane, and determining which orientation range each basic plane's orientation resides in. In some cases, normal vectors are computed for all of the basic planes, and the basic plane orientations are computed from the orientations of the normal vectors. In some cases, each basic plane orientation includes a strike angle and a dip angle for one of the basic planes. For example, the basic plane orientations can be computed using Equation 1 above. Other techniques can be used to compute a basic plane orientation.

In some implementations, the orientation ranges are pre-computed values. For example, the orientation ranges can be determined independent of the basic plane orientations. In some implementations, the orientation ranges are determined based on the orientations of the basic planes identified at 406. For example, as shown in FIG. 4, the basic plane orientation values can be sorted at 408, and the orientation ranges can be identified from the sorted basic plane orientation values at 410 (e.g., using some clustering methodology, nearest-neighbor schemes, etc.).

In some instances, the orientation ranges are identified from clustered sets of the sorted orientation values. For example, the orientation ranges can be identified by sorting the strike angles, identifying clusters of the sorted strike angles, sorting the dip angles, identifying clusters of the sorted dip angles, and defining the orientation ranges based on the clusters of sorted strike angles and the clusters of sorted dip angles. Example techniques for identifying the orientation ranges are described in U.S. Provisional Application No. 61/710,582, filed on Oct. 5, 2012.

At 412, the quantity of basic planes in each orientation range is calculated. The quantity of basic plane orientations can be a probability value, a frequency value, an integer number of planes, or another type of value. For example, the quantity of basic planes in a given orientation range can be the number of basic planes having a basic plane orientation in the given orientation range. As another example, the quantity of basic planes in a given orientation range can be the number of basic planes having a basic plane orientation in the given orientation range, divided by the total number of basic planes identified. The quantities can be normalized, for example, so that the quantities sum to one (or another normalization value). Example techniques for identifying the quantities are described in U.S. Provisional Application No. 61/710,582, filed on Oct. 5, 2012.

At 414, dominant fracture orientations are identified from the quantities calculated at 412. The dominant fracture orientations can be identified, for example, as the orientation ranges having the local higher maxima of basic plane orientations. In some instances, the dominant fracture orientations are identified based on the local maxima in histogram data generated from the quantities. A single dominant fracture orientation can be identified, or multiple dominant fracture orientations can be identified. In some instances, a dominant fracture orientation is identified based on the height, width, and other parameters of a peak in the histogram data. The dominant fracture orientation can be identified as the center point of an orientation range, the dominant fracture orientation can be computed as the mean orientation of basic planes in the orientation range, or the dominant fracture orientation can be computed in another manner. In some instances, a confidence level can be attached to the peak of the histogram data. The confidence level can indicate how much certainty is associated with the peak. The confidence level can be determined, for example, to be proportional to the number of entries in a specific bin which support the peak, or by any other appropriate techniques.

A dominant fracture orientation identified from the quantities calculated at 412 can represent the orientation of physical fractures within the subterranean zone. In some rock formations, fractures typically form in sets (or families) having parallel or similar orientations. Some formations include multiple sets of fractures. For example, a formation may include a first set of fractures having a primary orientation, which may be dictated by a maximum stress direction. A formation may also include a second set of fractures having a secondary orientation, which is different from the primary orientation. The secondary orientation may be separated from the primary orientation, for example, by ninety degrees or by another angle. In some cases, each of the dominant fracture orientations corresponds to the orientation of a fracture set in a subterranean zone.

In some instances, the dominant fracture orientation is identified according to an algorithm or technique that is capable of getting any preference orientation, for example, based on the physics or any other information. The algorithm can identify how strongly the data indicate the dominance of this orientation (e.g., based on a confidence value between 0 and 1), and the algorithm can take this information into account when generating the various prime orientation trends.

At 416, a histogram of the basic plane orientation values is displayed. The histogram indicates the quantity of basic plane orientations in each of the orientation ranges. An example histogram is shown in FIG. 2. The quantities can be displayed in another format or as another type of histogram. A histogram can be plotted, for example, in two dimensions or three dimensions. In some cases, the histogram is plotted as a continuous line or surface, as an array of discrete glyphs (e.g., a bar chart), as topographical regions, or as another type of graphical presentation. In addition to presenting a histogram, or as an alternative to presenting a histogram, the basic plane orientation values can be presented as numerical values, algebraic values, a numerical table, or in another format.

At 418, fracture planes are generated. The fracture planes can be generated, for example, based on the microseismic data points and the dominant fracture orientations identified at 414. In some cases, a cluster of microseismic events associated with each of the dominant fracture orientations is identified, and a fracture plane is generated from each cluster. In some instances, the fracture planes are identified based on the locations and other parameters of the measured microseismic events. For example, a fracture can be generated by fitting the individual clusters of microseismic events to a plane. Other techniques can be used to generate a fracture plane. Example techniques for generating fracture planes from microseismic data are described in U.S. Provisional Application No. 61/710,582, filed on Oct. 5, 2012.

In some instances, the algorithm can get an external input (e.g., from the user, from other physical considerations, etc.). The external input can include information, such as, for example, a given orientation is likely to be a prime orientation (thus carrying a pre-defined confidence tag), a given orientation is less likely to have planes in this direction (thus having a very small confidence level, or even zero). These types of inputs may bias the computation of the planes imbedded in the microseismic data set to reflect these preferences.

In some instances, the histogram is displayed in real time during the fracture treatment, and the histogram can be updated dynamically as additional microseismic events are detected. For example, each time a new microseismic event is received, additional basic planes can be identified and the quantity of basic planes in each orientation range can be updated accordingly. In some cases, the orientation ranges are also updated dynamically as microseismic data is received. Example techniques for updating a histogram based on additional microseismic data are described in U.S. Provisional Application No. 61/710,582, filed on Oct. 5, 2012.

In some cases, the fracture planes are updated in real time, for example, in response to collecting microseismic data. Example techniques for updating fracture planes from microseismic data are described in U.S. Provisional Application No. 61/710,582, filed on Oct. 5, 2012. In some cases, a confidence level for each fracture plane can be modified (e.g., increased, decreased) based on new microseismic data. In some instances, a new fracture plane can be created or a previously-generated fracture plane can be eliminated based on new microseismic data.

Some embodiments of subject matter and operations described in this specification can be implemented in digital electronic circuitry, or in computer software, firmware, or hardware, including the structures disclosed in this specification and their structural equivalents, or in combinations of one or more of them. Some embodiments of subject matter described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A client and server are generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). The relationship of client and server arises by virtue of computer programs running on the respective computers and having a client-server relationship to each other.

In some aspects of what is described here, dominant orientations embedded in sets of fractures associated with microseismic events can be dynamically identified during a fracture treatment. For example, fracture planes can be extracted from real time microseismic events collected from the field. The fracture planes can be identified based on microseismic event information including: event locations, event location measurement uncertainties, event moment magnitudes, event occurrence times, and others. At each point in time, data can be associated with previously-computed basic planes, including the microseismic supporting set of events.

In some aspects of what is described here, a probability histogram or distribution of basic planes can be constructed from the microseismic events collected, and the histogram or distribution can be used for deriving the dominant fracture orientations. In some instances, the construction of the histogram or distribution can be iterative, in the sense that the next iteration can present the peaks of the histogram or distribution in a better resolution (for example, by using more suitable bin sizes, or any other appropriate method). In some instances, from iteration to iteration, the number of bins at each of the orientation components, as well as the binning can be changed, improved, optimized, or otherwise updated. Fractures extracted along the dominant orientations can, in some instances, provide an optimal match to the real time microseismic events. The histogram or distribution and the dominant orientations can have non-negligible sensitivity to the new incoming microseismic event. As such, some planes identified during the time microseismic data are assimilated may not be accurate when comparing to the post microseismic event data results.

In some aspects of what is described here, an accuracy confidence parameter can provide a measure for the accuracy of real-time identified planes. Factors impacting a plane's accuracy confidence can include an event's intrinsic properties, the relationship between support events and the plane, and the weight reflecting the fracture orientation trends of post microseismic event data. In some instances, fracture planes with high confidence at the end of hydraulic fracturing treatment that were identified in real time fashion are consistent with those obtained from the post event data.

In some aspects, some or all of the features described here can be combined or implemented separately in one or more software programs for real-time automated fracture mapping. The software can be implemented as a computer program product, an installed application, a client-server application, an Internet application, or any other suitable type of software. In some cases, a real-time automated fracture mapping program can dynamically show users spatial and temporal evolution of identified fracture planes in real-time as microseismic events gradually accumulate. The dynamics may include, for example, the generation of new fractures, the propagation and growth of existing fractures, or other dynamics. In some cases, a real-time automated fracture mapping program can provide users the ability to view the real-time identified fracture planes in multiple confidence levels. In some instances, users may observe spatial and temporal evolution of the high confidence level fractures, which may exhibit the dominant trends of overall microseismic event data. In some cases, a real-time automated fracture mapping program can evaluate fracture accuracy confidence, for example, to measure the certainty of identified fracture planes. The accuracy confidence values may, for example, help users better understand and analyze changes in a probability histogram or orientation distribution, which may continuously vary with the real-time accumulation of microseismic events. In some cases, a real-time automated fracture mapping program can provide results that are consistent with post data fracture mapping. For example, at the end of the hydraulic fracture treatment, the results produced by the real-time automated fracture mapping program can be statistically consistent with those obtained by a post data automated fracture mapping program operating on the same data. Such features may allow field engineers, operators and analysts, to dynamically visualize and monitor spatial and temporal evolution of hydraulic fractures, to analyze the fracture complexity and reservoir geometry, to evaluate the effectiveness of hydraulic fracturing treatment and to improve the well performance.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

A number of embodiments have been described. Nevertheless, it will be understood that various modifications can be made. Accordingly, other embodiments are within the scope of the following claims.

The invention claimed is:

1. A computer-implemented method for identifying dominant fracture orientations in a subterranean zone, the method comprising:
 receiving microseismic event data associated with a fracture treatment of a subterranean zone;
 identifying coplanar subsets of microseismic events in the received microseismic event data, each of the coplanar subsets comprising a non-collinear triplet of microseismic events in the received microseismic event data;
 determining a basic plane orientation for each of a plurality of basic planes defined by the coplanar subsets, each basic plane orientation being defined by the non-collinear triplet of microseismic events in a respective one of the coplanar subsets;
 calculating, by data processing apparatus, the quantity of the basic plane orientations in each of a plurality of orientation ranges;
 identifying a dominant fracture orientation for the subterranean zone based on one or more of the quantities;
 identifying a cluster of microseismic events associated with the identified dominant fracture orientation;
 generating a fracture plane based on the identified dominant fracture orientation and the identified cluster of microseismic events associated with the identified dominant fracture orientation; and
 displaying a histogram of the basic plane orientations, wherein the histogram indicates the quantity of basic plane orientations in each of the orientation ranges.

2. The method of claim 1, wherein the quantity of the basic plane orientations includes a probability value.

3. The method of claim 1, wherein each basic plane orientation includes a strike angle and a dip angle for one of the basic planes.

4. The method of claim 3, further comprising identifying the plurality of orientation ranges based on the basic plane orientations by:
 sorting the strike angles;
 identifying clusters of the sorted strike angles;
 sorting the dip angles;
 identifying clusters of the sorted dip angles; and
 defining the orientation ranges based on the clusters of sorted strike angles and the clusters of sorted dip angles.

5. The method of claim 1, wherein the plurality of orientation ranges are fixed values determined independent of the basic plane orientations.

6. The method of claim 1, further comprising:
 identifying each coplanar subset of microseismic events from the microseismic event data; and
 computing a normal vector for the basic plane defined by each coplanar subset, wherein the basic plane orientations are computed based on the normal vectors.

7. The method of claim 1, wherein identifying a dominant fracture orientation includes identifying a plurality of dominant fracture orientations, and identifying the plurality of dominant fracture orientations includes identifying the orientation ranges corresponding to local maxima in a histogram of the basic plane orientations.

8. The method of claim 1, wherein identifying a dominant fracture orientation includes identifying a plurality of dominant fracture orientations, and the method further comprises:
 identifying a cluster of microseismic events associated with each of the dominant fracture orientations; and generating a dominant fracture plane for each dominant fracture orientation based on fitting the respective cluster of microseismic events.

9. The method of claim 1, wherein identifying coplanar subsets of microseismic events in the received microseismic event data comprises identifying all coplanar subsets of microseismic events in the received microseismic event data.

10. A non-transitory computer-readable medium encoded with instructions that, when executed by data processing apparatus, perform operations comprising:
receiving microseismic event data associated with a fracture treatment of a subterranean zone;
identifying coplanar subsets of microseismic events in the received microseismic event data, each of the coplanar subsets comprising a non-collinear triplet of microseismic events in the received microseismic event data;
determining a basic plane orientation for each of a plurality of basic planes defined by the coplanar subsets, each basic plane orientation being defined by the non-collinear triplet of microseismic events in a respective one of the coplanar subsets;
calculating the quantity of the basic plane orientations in each of a plurality of orientation ranges;
identifying a dominant fracture orientation for the subterranean zone based on one or more of the quantities;
identifying a cluster of microseismic events associated with the identified dominant fracture orientation;
generating a fracture plane based on the identified dominant fracture orientation and the identified cluster of microseismic events associated with the identified dominant fracture orientation; and
displaying a two-dimensional histogram of the basic plane orientations, wherein the histogram indicates the quantity of basic plane orientations in each of the orientation ranges.

11. The computer-readable medium of claim 10, wherein each basic plane orientation includes a strike angle and a dip angle for one of the basic planes, and the operations further comprise identifying the plurality of orientation ranges based on the basic plane orientations by:
sorting the strike angles;
identifying clusters of the sorted strike angles;
sorting the dip angles;
identifying clusters of the sorted dip angles; and
defining the orientation ranges based on the clusters of sorted strike angles and the clusters of sorted dip angles.

12. The computer-readable medium of claim 10, wherein the plurality of orientation ranges are fixed values determined independent of the basic plane orientations.

13. The computer-readable medium of claim 10, wherein the operations further comprise:
identifying each coplanar subset of microseismic events from the microseismic event data; and
computing a normal vector for the basic plane defined by each coplanar subset, wherein the basic plane orientations are computed based on the normal vectors.

14. The computer-readable medium of claim 10, wherein identifying a dominant fracture orientation includes identifying a plurality of dominant fracture orientations, and the operations further comprise:
identifying a cluster of microseismic events associated with each of the dominant fracture orientations; and
generating a dominant fracture plane for each dominant fracture orientation based on fitting the respective cluster of microseismic events.

15. The computer-readable medium of claim 10, wherein identifying coplanar subsets of microseismic events in the received microseismic event data comprises identifying all coplanar subsets of microseismic events in the received microseismic event data.

16. A system comprising:
a computer-readable medium that stores microseismic event data associated with a fracture treatment of a subterranean zone; and
data processing apparatus operable to:
receive microseismic event data associated with the fracture treatment of the subterranean zone;
identify coplanar subsets of microseismic events in the received microseismic event data, each of the coplanar subsets comprising a non-collinear triplet of microseismic events in the received microseismic event data;
determine a basic plane orientation for each of a plurality of basic planes defined by the coplanar subsets, each basic plane orientation being defined by the non-collinear triplet of microseismic events in a respective one of the coplanar subsets;
calculate the quantity of the basic plane orientations in each of a plurality of orientation ranges;
identify a dominant fracture orientation for the subterranean zone based on one or more of the quantities;
identify a cluster of microseismic events associated with the identified dominant fracture orientation;
generate a fracture plane based on the identified dominant fracture orientation and the identified cluster of microseismic events associated with the identified dominant fracture orientation; and
display a histogram of the basic plane orientations, wherein the histogram indicates the quantity of basic plane orientations in each of the orientation ranges.

17. The system of claim 16, wherein each basic plane orientation includes a strike angle and a dip angle for one of the basic planes, and the data processing apparatus is further operable to identify the plurality of orientation ranges based on the basic plane orientations by:
sorting the strike angles;
identifying clusters of the sorted strike angles;
sorting the dip angles;
identifying clusters of the sorted dip angles; and
defining the orientation ranges based on the clusters of sorted strike angles and the clusters of sorted dip angles.

18. The system of claim 16, wherein the plurality of orientation ranges are fixed values determined independent of the basic plane orientations.

19. The system of claim 16, the data processing apparatus is further operable to:
identify each coplanar subset of microseismic events from the microseismic event data; and
compute a normal vector for the basic plane defined by each coplanar subset, wherein the basic plane orientations are computed based on the normal vectors.

20. The system of claim 16, the data processing apparatus is operable to identify all coplanar subsets of microseismic events in the received microseismic event data.

* * * * *